(12) United States Patent
Raaijmakers et al.

(10) Patent No.: US 11,425,314 B2
(45) Date of Patent: Aug. 23, 2022

(54) METHOD FOR SUPPRESSION OF REPRESENTATIONS OF REFLECTIONS IN AT LEAST ONE CAMERA IMAGE OF A CAMERA OF AN ENVIRONMENT SENSOR DEVICE OF A MOTOR VEHICLE AND THE CORRESPONDING ENVIRONMENT SENSOR DEVICE

(71) Applicant: AUDI AG, Ingolstadt (DE)

(72) Inventors: Marvin Raaijmakers, Ingolstadt (DE); Stefan Krämer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/282,715

(22) PCT Filed: Sep. 24, 2019

(86) PCT No.: PCT/EP2019/075693
§ 371 (c)(1),
(2) Date: Apr. 2, 2021

(87) PCT Pub. No.: WO2020/069919
PCT Pub. Date: Apr. 9, 2020

(65) Prior Publication Data
US 2022/0006936 A1  Jan. 6, 2022

(30) Foreign Application Priority Data

Oct. 4, 2018  (DE) ..................... 10 2018 216 983.7

(51) Int. Cl.
*H04N 5/238* (2006.01)
*G02B 27/28* (2006.01)
(Continued)

(52) U.S. Cl.
CPC ........... *H04N 5/238* (2013.01); *G02B 27/281* (2013.01); *G06V 10/60* (2022.01); *G06V 20/58* (2022.01); *G08G 1/166* (2013.01); *H04N 5/2254* (2013.01)

(58) Field of Classification Search
None
See application file for complete search history.

(56) References Cited

U.S. PATENT DOCUMENTS

2010/0157082 A1 * 6/2010 Katerberg .............. G03B 17/14
                                                         348/222.1
2017/0243079 A1   8/2017 Hiriyannaiah et al.
(Continued)

FOREIGN PATENT DOCUMENTS

DE  10 2011 088 130 A1  6/2013
DE  10 2012 222 303 A1  12/2013
(Continued)

*Primary Examiner* — Hung Q Dang
(74) *Attorney, Agent, or Firm* — Seed IP Law Group LLP

(57) ABSTRACT

In a method for suppression of reflections in at least one camera image of a camera of a motor vehicle, the camera generates the at least one camera image and thereby a polarization filter device dampens light incident from a surrounding field in regard to a predetermined polarization direction. An estimator device estimates a respective orientation of a respective surface normal of at least one surface on at least one environment object and an adjusting device determines a respective target polarization direction for the polarization filter device in dependence on the respective estimated orientation of the at least one surface normal, by which a respective representation of reflections at the respective surface is reduced in the at least one camera image, and generates a control signal according to the respectively determined target polarization direction, and the polarization filter device adjusts its polarization direction in dependence on the control signal.

9 Claims, 3 Drawing Sheets

(51) Int. Cl.
*G06V 10/60* (2022.01)
*G06V 20/58* (2022.01)
*G08G 1/16* (2006.01)
*H04N 5/225* (2006.01)
*G03B 11/00* (2021.01)
*G03B 15/00* (2021.01)
*G06V 10/145* (2022.01)

(56) References Cited

U.S. PATENT DOCUMENTS

| | | |
|---|---|---|
| 2018/0268246 A1 | 9/2018 | Kondo et al. |
| 2018/0284260 A1 | 10/2018 | Oyaizu et al. |
| 2018/0301032 A1 | 10/2018 | Hirasawa et al. |
| 2019/0273856 A1 * | 9/2019 | Hirasawa ............... H04N 5/225 |

FOREIGN PATENT DOCUMENTS

| | | | |
|---|---|---|---|
| DE | 10 2014 017 229 A1 | 5/2016 | |
| DE | 102017006781 A1 * | 1/2018 | ............. B60R 11/04 |
| EP | 3 544 283 A1 | 9/2019 | |
| JP | 2016-126410 A * | 7/2016 | |
| JP | 2020166479 A * | 3/2019 | |
| WO | 2018/092540 A1 | 5/2018 | |

\* cited by examiner

METHOD FOR SUPPRESSION OF REPRESENTATIONS OF REFLECTIONS IN AT LEAST ONE CAMERA IMAGE OF A CAMERA OF AN ENVIRONMENT SENSOR DEVICE OF A MOTOR VEHICLE AND THE CORRESPONDING ENVIRONMENT SENSOR DEVICE

BACKGROUND

Technical Field

Embodiments of the invention relate to an environment sensor device for a motor vehicle. The environment sensor device detects at least one environment object in a surrounding field of the motor vehicle by means of a camera. In order to not represent reflections which may be present on a surface of an environment object in the camera images of the camera, a polarization filter device is provided. Embodiments of the invention also include a motor vehicle having the environment sensor device as well as a method for the suppression of representations of said reflections in camera images.

Description of the Related Art

The use of a polarization filter device is known, for example, from DE 10 2014 017 229 A1. By means of the polarization filter device, those reflections are not represented in camera images of a camera that are visible in a windshield of the motor vehicle through which the camera is filming a surrounding field of the motor vehicle. The arrangement of the polarization filter device is only static, which is adequate here, since the reflections are always the same, namely, a mirroring of the dashboard in the windshield.

It is known from DE 10 2012 222 303 A1 how to suppress dynamic or variable reflections in camera images by computing a differential image from two camera images, one of which was taken using a polarization filter and one without using a polarization filter. But this method is very computation-intensive.

From DE 10 2011 088 130 A1 there is known a motor vehicle in which an environment sensor device determines a red component in camera images and uses this to decide whether a braking situation exists in front of the motor vehicle. Reflections of brake lights on other objects are used here, so that they do not need to be filtered out.

BRIEF SUMMARY

In a motor vehicle, a processor device can identify at least one environment object in the surrounding field of the motor vehicle on the basis of camera images of a camera. This can be utilized, for example, to provide for an autonomous driving function and/or a driver assist function in the motor vehicle. For example, the environment object which is identified may be another motor vehicle, and the system may determine whether a collision course is present. However, when detecting the at least one environment object on the basis of at least one camera image of a camera there may occur a false recognition, which means that a supposed environment object is detected, although this is merely a reflection in a reflecting surface of another environment object. Such an example may occur when a bicyclist is riding next to a bus and a reflection of the bicyclist can be seen in the varnished and thus reflecting surface of a side wall of the bus. When assessing a camera image of a camera, a processor device may then identify two bicyclists, although only one bicyclist and their mirror image are represented in the at least one camera image. Another form of unwanted reflection is highlights or shine which may prevent a smooth, homogeneous surface from being recognized as such.

The reflection of light on a reflective surface of an environment object generally produces polarized light. Thus, by the use of a polarization filter device, it is possible to suppress or dampen or reduce the light which belongs to a reflection or originates in a reflection by means of a polarization filter device when detecting a camera image. Hence, at least a dampened or no representation of the reflection will result in the camera image.

However, the orientation of the polarization of reflected light is dependent on the spatial orientation of the reflecting surface in which the reflection can be seen. Accordingly, the polarization direction of a polarization filter device must also be adapted or tracked. A static orientation of a polarization filter device is inadequate for dynamic processes, such as the monitoring of at least one environment object in the surrounding field of a motor vehicle.

Some embodiments help to ensure that reflections which may occur on a reflecting surface of at least one environment object are only represented in a reduced or attenuated or dampened manner in a camera image in an environment sensor device having a camera.

An environment sensor device or surrounding field sensor device is provided for a motor vehicle. The environment sensor device comprises a camera, a polarization filter device and a processor device. The camera is adapted to create at least one camera image in which a surrounding field or an environment of the motor vehicle is represented. The polarization filter device is adapted to dampen or filter light entering the camera from the surrounding field upon detecting the at least one camera image, i.e., during the detecting of the at least one camera image, in relation to a predetermined polarization direction. In other words, a preferred direction exists in regard to the polarization of the light, which is let through by the polarization filter device, and there is a polarization direction indicating which light is dampened, and with which polarization. The processor device is adapted to identify at least one environment object in the at least one camera image. The respective environment object which is identified may be, for example, another traffic participant, such as a motor vehicle and/or a bicyclist and/or a pedestrian. But the respective environment object which is identified can also be a stationary object, such as an infrastructure component (such as a traffic light and/or a street light) and/or a tree and/or a parking motor vehicle and/or a house with a reflective window pane. By "identify" is meant here that at least the shape of the environment object and/or an object class is identified (designated as motor vehicle, pedestrian, bicyclist, traffic light, etc.). This may be done, for example, on the basis of a neural net. A processor device for the identifying of at least one environment object in at least one camera image may be borrowed from the prior art.

Now, in order to prevent the processor device from also wrongly taking a mirror image, i.e., a reflection of an environment object on a surface of another environment object, or an especially glaring highlight, to be another environment object, it is proposed that the polarization filter device is adapted to adjust its polarization direction in dependence on a control signal. In other words, an electrical and/or digital control signal can control or adjust which light with which polarization is either let through or dampened by the polarization filter device.

In order to determine the required orientation of the polarization direction, an estimator device of the environment sensor device is adapted to estimate a respective orientation of a respective surface normal of at least one surface of the at least one environment object. The estimator device may thus, for example, rely upon or utilize an identification result of the processor device, since the processor device describes the at least one environment object by its identification process. The estimator device may then estimate the orientation of the surface, that is, its surface normal, for at least one surface of the at least one object.

Furthermore, an adjusting device is adapted to determine each time a target polarization direction for the polarization filter device in dependence on the respective estimated orientation of the at least one surface. In other words, the adjusting device establishes how the polarization direction of the polarization filter device needs to be oriented in order for a respective reflection, which might be visible on the at least one surface, not to be represented in the at least one camera image. For this, the target polarization direction is established such that light reflected on the respective surface is dampened or suppressed or reduced by the polarization filter device. This is possible because the polarization of light which is reflected on a surface is dependent on the orientation of the surface, that is, the orientation of the surface normal. The surface normal is an (imaginary) directional vector situated or standing perpendicular to the surface. The relationship between the orientation of a surface normal and the resulting polarization of reflected light is known in the prior art. The target polarization direction thus indicates the adjustment of the polarization direction of the polarization filter device which reduces or dampens or suppresses a respective representation of reflections in the at least one camera image, i.e., light reflected on the at least one surface.

The adjusting device then generates said control signal, by which the polarization filter device is actuated so as to adjust its polarization direction according to the respectively determined target polarization direction. In other words, the polarization direction is adapted or oriented in dependence on the at least one camera image.

In some embodiments, a polarization filter device is operated dynamically or adaptively in that its polarization direction is adapted to the current environmental situation in the surrounding field of the motor vehicle, so that a respective reflecting surface of at least one environment object is taken into account when orienting the polarization direction of the polarization filter device. Thus, it is not necessary to rely on a statically oriented polarization filter.

Several embodiments relate to the issue of how the polarization direction can be adaptively configured in the polarization filter device.

In one embodiment, the polarization filter device comprises a rotatably mounted polarization filter disk, having the polarization direction. Such a polarization filter disk may be, for example, a glass disk or a plastic disk on which a metallic layer is vapor-deposited or applied, thereby realizing a wire grid polarizer. The polarization filter disk may also be formed on the basis of a crystal with polarization action. The polarization filter device may furthermore comprise an actuator unit for rotating the polarization filter disk. This actuator unit is adapted to adjust a rotation position or spatial orientation of the polarization filter disk in dependence on said control signal. In other words, the polarization filter disk can be rotated, thereby adjusting an orientation of its polarization direction. The polarization filter disk can be arranged in front of or in an optics of the camera. Thus, it is situated in an optical path of the camera in front of its sensor chip. This embodiment has the advantage that a conventional polarization filter disk can be used to realize the polarization filter device.

In one embodiment, the polarization filter device comprises a sensor chip of the camera also having multiple subpixel sensors (i.e., several of them for each pixel) for detecting pixels of the at least one camera image. These subpixel sensors have different polarization directions. In other words, each pixel in the sensor chip is formed not only by a single pixel sensor, which may be designed, for example, to detect the colors of red, yellow, blue (RYB), but also multiple pixel sensors are present for each pixel, so that these likewise represent subpixel sensors. Each subpixel sensor may have its own polarization filter, the polarization directions of the multiple subpixel sensors of each pixel being oriented differently. Thus, by selecting one of the subpixel sensors or several of the subpixel sensors and by routing only their pixel data, it is possible to create a camera image in which light detection occurs with a polarization effect. This yields the advantage that different image regions of a camera image can be detected with different polarization direction. Two or more than two subpixel sensors of the described kind may be provided for each pixel.

Several embodiments relate to the issue of how the respective surface normal of the at least one surface can be estimated by the estimator device.

In one embodiment, the estimator device for estimating the orientation of the respective surface normal comprises a sensor arrangement for detecting of 3D (three-dimensional) image information. The estimator device is adapted to determining the orientation of the respective surface normal of the at least one surface on the basis of the 3D image information by determining a spatial orientation of the respective surface. Thus, it can be determined how a surface is situated or oriented in space. The spatial orientation of its surface normal can then also be deduced in familiar manner. Hence, the respective surface is surveyed and its orientation can then be determined for a surface normal. If the surface is curved, the surface can be divided up in virtual or imaginary fashion into multiple partial surfaces and the surface normal can be determined for each partial surface. But it may also be proposed to calculate an average surface normal for the entire surface. The sensor arrangement used may be, for example, a laser scanner and/or a lidar and/or a radar and/or a TOF camera (TOF=Time of Flight) and/or a 3D camera. The estimator device may furthermore comprise a program module, which can be executed, for example, by said processor device and which can determine the orientation on the basis of the 3D image information.

In one embodiment, the estimator device for estimating the orientation of the respective surface normal of the at least one surface is adapted to operate a digital surface model, which estimates a respective shape and/or posture (spatial position and orientation) of the at least one environment object in dependence on the at least one camera image and determines from this the orientation of the respective surface normal for the at least one surface of the respective environment object. The estimator device for this can be formed on the basis of a program module or software module, which can be operated, for example, by said processor device. For example, the surface model can provide that a standard model for an environment object is adapted on the basis of the at least one camera image, i.e., at least one parameter of the standard model is adapted in such a way or for so long in regard to the size and/or posture and/or shape of the environment object, for example, such as by an iterative adapting process, until the standard model corresponds to a representation of the environment object which is present in the at least one camera image or correctly predicts that representation, which can be accomplished or verified or concluded by a comparison between the representation of the environment object and the surface model. If the surface model then conforms to the representation which is evident in the at least one camera image, it is verified or assured that the surface model correctly reproduces or describes a surface of the environment object. The orientation of the respective surface normal of the at least one surface can then be determined on the basis of the surface model.

It may be provided that each time only a single surface or more than one surface is determined or verified for one environment object or for more than one environment object.

As already described, the polarization filter device may provide a single polarization direction for the detecting of the overall camera image or, alternatively, it may provide a respective polarization direction, which can be adjusted independently of the respective polarization direction of another region, for multiple separate regions of a camera image, e.g., for the individual pixels. But it may also happen that a respective target polarization direction is determined for a number of surfaces which are recognizable or represented in the at least one camera image and this number is larger than the number of the possible different polarization directions which can be actually adjusted or dictated in the polarization filter device at the same time. In other words, a reduction or selection is then necessary in order to dictate or adjust the possible number of adjustable polarization directions by means of the control signal, i.e., only a single polarization direction or a predetermined number greater than 1, for example, even though several different polarization directions are necessary.

For this, one embodiment proposes that the estimator device and/or the processor device are each adapted to determine a respective reflectance of the at least one surface. Thus, they determine how much light, or what percentage of light, the respective surface can reflect. For example, it is determined how strongly the respective surface reflects or how smooth it is. This is expressed by a value which is described here as the reflectance. The estimator device is adapted to reduce, by means of the control signal, the formation of reflections only for those surfaces whose reflectance is greater than a predetermined threshold value, i.e., the most strongly reflecting surfaces. In addition or alternatively, it may be provided that the number of selected surfaces is smaller than a predetermined maximum number. This maximum number may be dictated by the polarization filter device in the described manner, this having only a limited number of simultaneously adjustable polarization directions. The maximum number may be 1 or greater than 1. In the described sensor chip with subpixel sensors, the maximum number may correspond to the number of pixels. Using the threshold value for the reflectance yields the advantage that only those surfaces will be considered for which there is a predetermined minimum probability, so that the processor device can identify here a false environment object based on a reflection. The reflectance can be identified, e.g., by means of an object type of an environment object. The object type can be identified by the processor device using the described object identification.

If the polarization filter device has only one polarization direction, it can be provided that only a single target polarization direction is dictated by the control signal. This may involve a polarization direction which is determined for one particular environment object and for one particular surface there. For example, it may involve the largest surface which can be identified in the at least one camera image. But the target polarization direction can also be an average of multiple determined directions, for example, which have been determined for different surfaces.

In one embodiment, the estimator device and/or the processor device are each adapted to associate the at least one environment object with a respective degree of criticality. This degree of criticality pertains to the collision danger which may exist between the motor vehicle and this environment object. It is possible to make use of a driver assist device here, which can assess a traffic situation and signal, for example, a collision course for an environment object. The estimator device is adapted to reduce, by means of the control signal, the formation of reflections only for the environment object having the highest degree of criticality. In other words, a checking is done only for the most critical object as to whether a reflection could be seen that needs to be reduced or suppressed. This advantageously prevents a supposed collision danger from triggering an automatic emergency braking of the motor vehicle, for example, because a further supposed environment object situated on a supposed collision course is identified in a reflection.

Some embodiments also comprise a motor vehicle having one embodiment of the environment sensor device described herein. This motor vehicle has the advantage that it can detect or identify at least one environment object in its surrounding field or in its environment and is thereby protected against identifying or detecting a supposed further environment object, which is not actually present, in a reflection on a surface.

The motor vehicle described herein may be configured as an automobile, especially a passenger car or truck or minibus.

Thanks to the operation of the environment sensor device described herein, a method is produced. In other words, the method involves the suppression of representations of reflections (mirror images and/or highlights) in at least one camera image of a camera which is operated in an environment sensor device of a motor vehicle. The camera generates the at least one such camera image, in which an environment or a surrounding field of the motor vehicle is represented. A polarization filter device dampens the light entering the camera from the surrounding field with respect to a predetermined polarization direction, so that this light is only reproduced in dampened or reduced form in the at least one camera image. A processor device identifies at least one environment object in the at least one camera image. An estimator device now estimates a respective orientation of a respective surface normal of at least one surface in the at least one environment object. This may be done for one environment object or for more than one environment object. It may be done for one surface or for more than one surface of each environment object. An adjusting device determines, in dependence on the respective estimated orientation of the at least one surface, a respective target polarization direction of the polarization filter by which a respective representation of reflections on the respective surface is reduced in the at least one camera image. The adjusting device generates a control signal according to the respectively determined target polarization direction. The described selection for one environment object or several environment objects and for one surface or several surfaces can also be done, if the polarization filter device cannot adjust so many different polarization directions at the same time for different regions corresponding to the identified surfaces. The polarization filter then adjusts its polarization direction in dependence on the control signal.

Embodiments of the invention also include modifications of the method having features already described in connection with the modifications of the motor vehicle described herein. For this reason, the corresponding modifications of the method are not described again here.

Embodiments of the invention also encompass combinations of the features described herein.

DETAILED DESCRIPTION

In the figures, the same reference numbers each time denote functionally identical elements.

Figure 1:
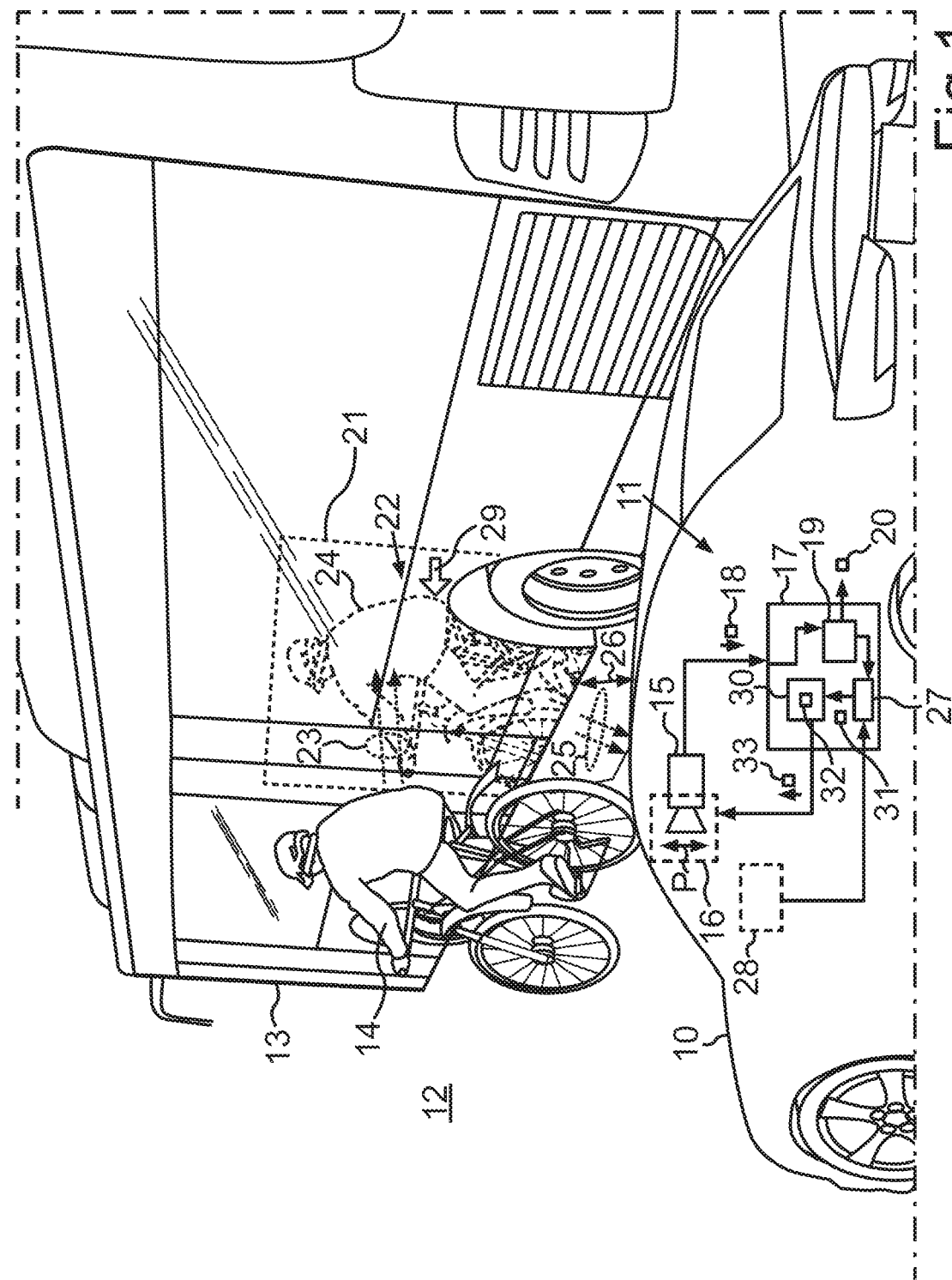
FIG. 1 illustrates a schematic representation of one embodiment of a motor vehicle having an environment sensor device.

FIG. 1 shows a motor vehicle 10, which may be an automobile, especially a passenger car or a truck. The motor vehicle 10 may comprise an environment sensor device 11, by means of which an environment or a surrounding field 12 of the motor vehicle 10 can be detected in automated manner in the motor vehicle 10. In particular, at least one environment object 13, 14 can be detected and identified in the surrounding field 12 by means of the environment sensor device 11. FIG. 1 shows, for example, that the environment object 13 may be a minibus and the environment object 14 may be a bicyclist.

The environment sensor device 11 may comprise a camera 15, a polarization filter device 16 and a processor device 17. The camera 15 may be, for example, a color camera or an infrared camera or a grayscale camera or a combination of these camera types. The camera 15 may be a single-image camera or a video camera. At least one camera image 18 of the camera 15 can be received by the processor device 17. The processor device 17 may comprise a software module or a program module 19, by means of which the respective representation of the at least one environment object 13, 14 can be identified or segmented in the at least one camera image 18 and then the at least one environment object 13, 14 can be identified as such, i.e., an object type and/or its shape, for example. The program module 19 thus performs an object identification. For example, the program module 19 may create an environment model or a surrounding field model 20, which may be a map of the surroundings, for example, by which the respective relative position of the at least one environment object 13, 14 in regard to the motor vehicle 10 can be mapped or described. For example, the environment sensor device may signal an autonomous driving function as to where the at least one environment object 13, 14 is situated. The processor device 17 may be formed on the basis of at least one microprocessor and/or at least one microcontroller.

Upon detecting the at least one environment object 13, 14 on the basis of the at least one camera image 18, it may happen that not only an actual environment object 13, 14 is identified, but also, for example, a reflection 22 of another environment object 14 is reproduced in the at least one camera image 18 on account of a reflecting surface 21. FIG. 1 shows how the reflection 22 may come about, where light 23 coming from one environment object 14 is reflected on a reflecting surface 21 of another environment object 13 and the light 25 reflected at the surface 21 reaches the camera 15 and is thus detected by it. However, the reflected light 23 may have a dominant or oriented polarity on account of the reflection 22 at the surface 21. Due to the reflection 22, a mirror image 24 of the mirrored or reflected environment object 14 may be recognizable in the surface 21.

Yet the polarization 26 of the reflected light 25 may make it possible to suppress the reflection 22, i.e., the mirror image 24, in the at least one camera image 18. For this, the environment sensor device 11 may provide that a polarization direction P of the polarization filter device 16 can be adjusted. For this, an estimator device 27 can determine where a respective surface 21 is located on the at least one environment object 13, 14. It may be provided that the polarization filter device 16 has an adaptive design in regard to the orientation of its polarization direction P.

An estimator device 27 may determine each time, for the at least one detected environment object 13, 14 which can be detected by the object identification of the program module 19, whether and where a possibly reflecting surface 21 is located. In addition or alternatively to the use of the object identification of the program module 19, it may be provided that the estimator device comprises a sensor arrangement 28 by means of which the spatial arrangement of the at least one reflecting surface 21 can be actively surveyed. For this, the sensor arrangement 28 may comprise a lidar, for example, and/or a 3D-camera. On the basis of the surveyed surface 21, a normal vector 29 of the surface 21 can be estimated or ascertained. The normal vector indicates the direction perpendicular to the respective surface 21. This normal vector 29 describes the surface normal of the respective surface 21. But the surface normal can also be estimated or described simply as the definition of a plane, for example, running parallel to the surface 21. The estimator device 27 may be designed, for example, as a further program module of the processor device 17.

An adjusting device can determine a target polarization direction 32 in dependence on an estimated orientation 31 of the respective normal vector 29 of the at least one surface 21, indicating which orientation the polarization direction P of the polarization filter device 16 needs to have in order for the reflected light 25 to be suppressed or reduced by the polarization filter device 16, so that it is not reproduced in the at least one camera image 18. The adjusting device may generate a control signal 33, which adjusts the adjustable polarization direction P of the polarization filter device 16 according to the target polarization direction 32.

It can therefore be prevented that the mirror image 24 is represented or contained in the at least one camera image 18. Hence, the program module 19 also cannot inadvertently identify the mirror image 24 as another supposed environment object.

Thus, a false alarm in regard to a further supposed environment object is avoided.

Figure 2:
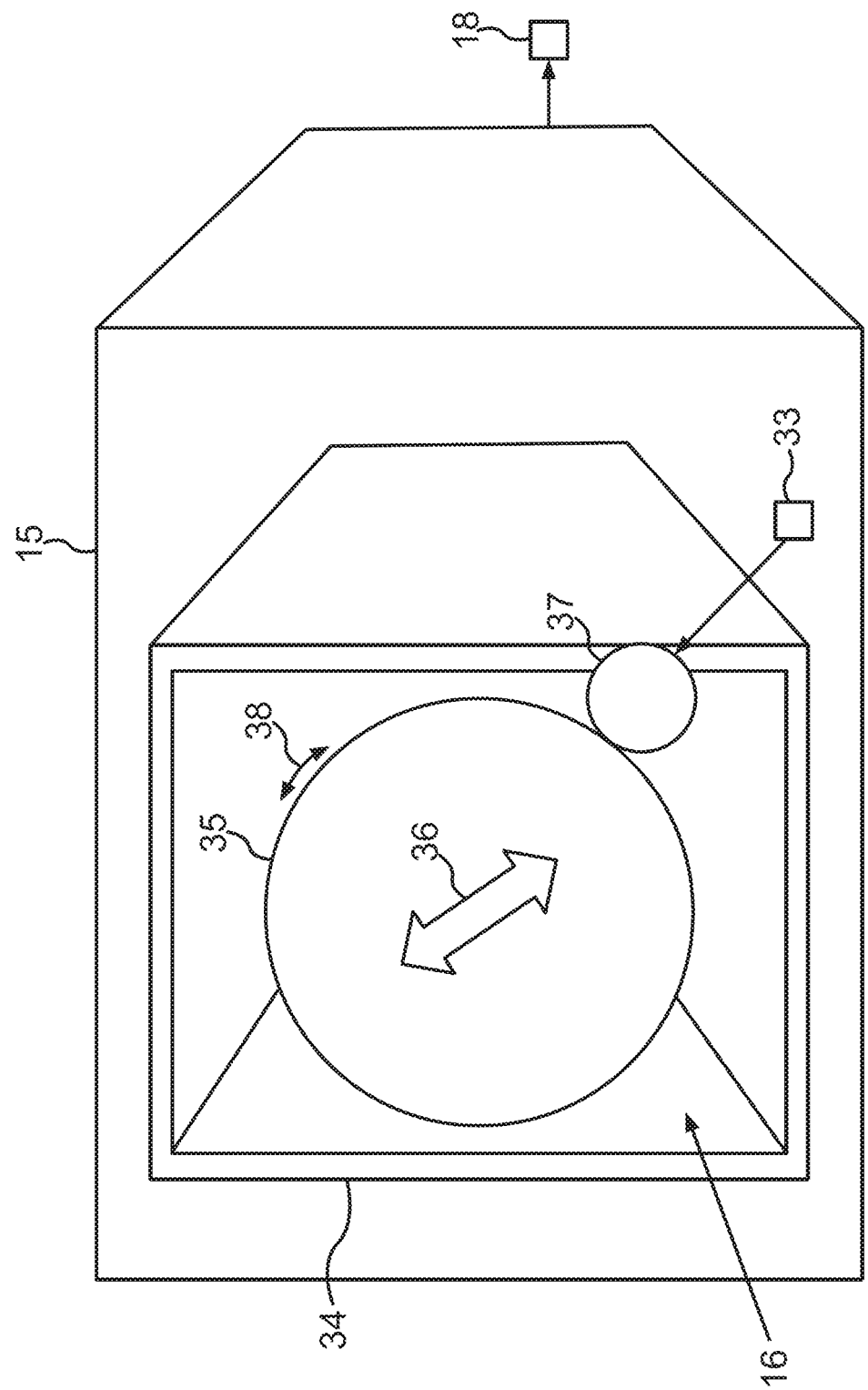
FIG. 2 illustrates a schematic representation of a polarization filter device.

FIG. 2 illustrates how the polarization filter device 16 can be provided on the camera 15. In an optical path 34 of the camera 15 there can be arranged, for example, a rotatably mounted polarization filter disk 35. The optical path 34 may be present before or after a lens of the camera 15, for example. A polarization direction 36 of the polarization filter disk 35 is visualized in FIG. 2. An actuator unit 37 may be provided for the adjusting or orienting of the polarization direction 36, which can adjust a rotary position 38 of the polarization filter disk 35 in dependence on the control signal 33. The oriented polarization direction 36 corresponds to the polarization direction P.

Figure 3:
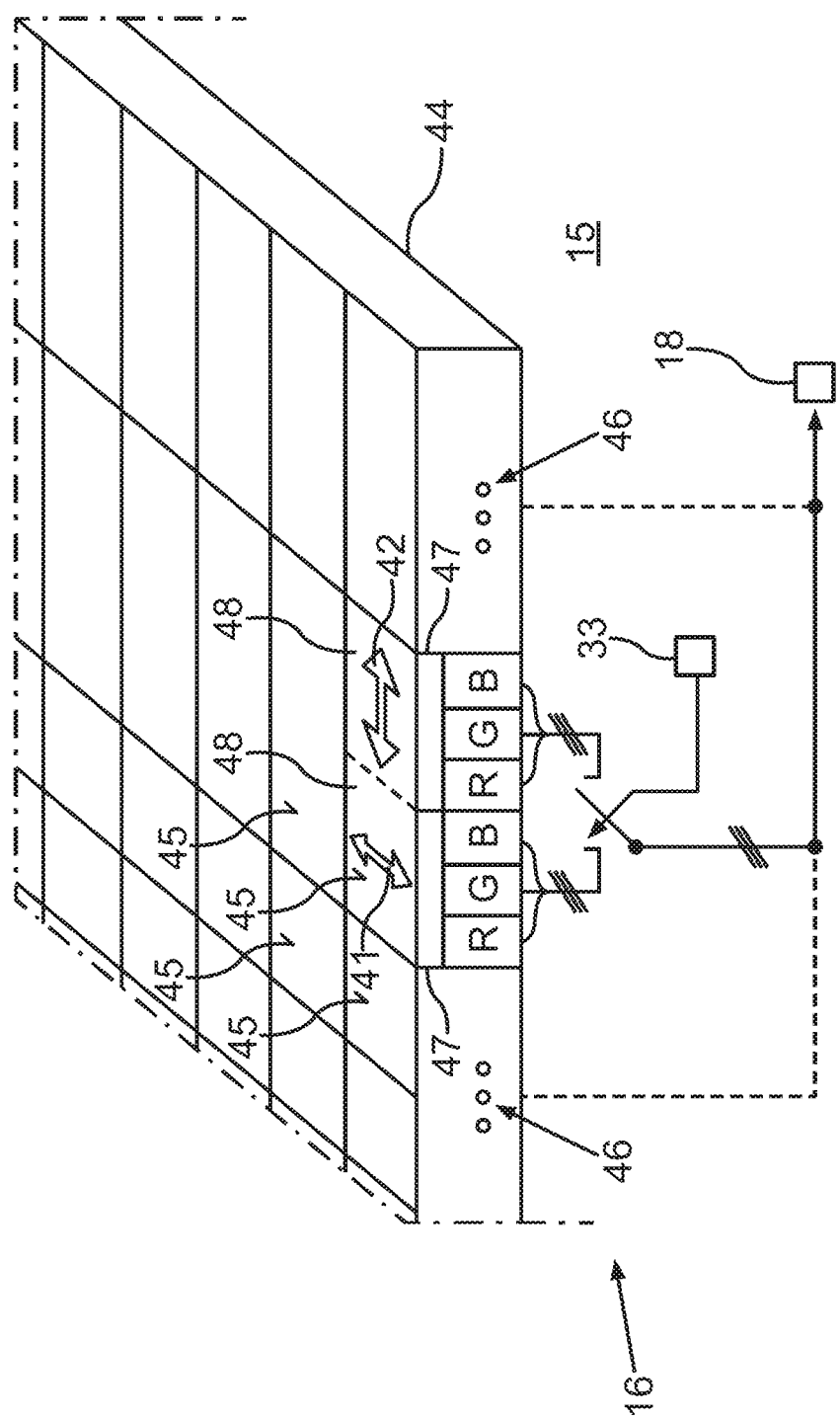
FIG. 3 illustrates a schematic representation of a polarization filter device.

FIG. 3 illustrates how an individual polarization filter can be provided each time as the polarization filter device 16 for individual pixels 45 in a sensor chip 44 of the camera 15. For simplicity, only some of the pixels are provided with reference numbers in FIG. 3. Only the layout for an individual pixel 45 is represented in FIG. 3. The other pixels 45 may have the same layout, as symbolized in FIG. 3 by ellipsis 46.

A pixel 45 may comprise multiple subpixels 47, by means of which a pixel can be detected each time, for example, a RYB (red, yellow, blue) detecting can be performed. The polarization filter device provided for each subpixel 47 may be an individual polarization filter 48, but a different polarization direction 41, 42 may be provided for each subpixel 47. When detecting the at least one camera image 18, a switching can be done individually for each pixel 45 among the subpixels 47 in dependence on the control signal 33. Hence, the polarization direction 41, 42 can be adjusted individually for each pixel 45. The actually used polarization direction 41, 42 corresponds to the polarization direction P. Two or more than two subpixel sensors may be provided for each pixel 45, one for each subpixel 47, for example, four subpixel sensors having polarization directions situated with a consecutive rotation of 45° relative to each other.

The embodiments described herein can provide active reflection filtering for a video-based environment sensor device.

Aspects and features of the various embodiments described above can be combined to provide further embodiments. These and other changes can be made to the invention in light of the above-detailed description.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An environment sensor device for a motor vehicle, the environment sensor device comprising:
a camera for creating at least one camera image representing a surrounding field of the motor vehicle;
a polarization filter device adapted to dampen light having a polarization direction entering the camera from the surrounding field; and
a processor device adapted to identify at least one environment object in the at least one camera image,
wherein the polarization filter device is adapted to adjust the polarization direction in dependence on a control signal,
wherein an estimator device is adapted to estimate an orientation of at least one surface of the at least one environment object, and
wherein an adjusting device is adapted to determine a target polarization direction for the polarization filter device in dependence on the estimated orientation of the at least one surface, by which a representation of reflections on the at least one surface in the at least one camera image is reduced, and to generate the control signal according to the target polarization direction.

2. The environment sensor device according to claim 1, wherein the polarization filter device comprises a rotatably mounted polarization filter disk having the polarization direction and an actuator unit for rotating the polarization filter disk, and the actuator unit is adapted to adjust a rotation position of the polarization filter disk in dependence on the control signal.

3. The environment sensor device according to claim 1, wherein the polarization filter device comprises a sensor chip of the camera having multiple subpixel sensors per pixel for detecting pixels of the at least one camera image, these having different polarization directions.

4. The environment sensor device according to claim 1, wherein the estimator device comprises a sensor arrangement for detecting 3D image information and the estimator device is adapted to determine the orientation on the basis of the 3D image information.

5. The environment sensor device according to claim 1, wherein the estimator device is adapted to operate a digital surface model, which estimates a shape and/or posture of the at least one environment object in dependence on the at least one camera image and determines from this the orientation.

6. The environment sensor device according to claim 1, wherein the estimator device and/or the processor device is adapted to determine a reflectance of the at least one surface, and the estimator device is adapted to reduce, by using the control signal, the formation of reflections only for those surfaces whose reflectance is greater than a predetermined threshold value and/or whose number is fewer than a predetermined maximum number.

7. The environment sensor device according to claim 1, wherein the estimator device and/or the processor device is adapted to associate the at least one environment object with a degree of criticality in relation to a collision danger, and the estimator device is adapted to reduce, by using the control signal, the formation of reflections only if the environment object has a highest degree of criticality.

8. A motor vehicle having an environment sensor device comprising:
a camera for creating at least one camera image representing a surrounding field of the motor vehicle;
a polarization filter device adapted to dampen light having a polarization direction entering the camera from the surrounding field; and
a processor device adapted to identify at least one environment object in the at least one camera image,
wherein the polarization filter device is adapted to adjust the polarization direction in dependence on a control signal,
wherein an estimator device is adapted to estimate an orientation of at least one surface of the at least one environment object, and
wherein an adjusting device is adapted to determine a target polarization direction for the polarization filter device in dependence on the estimated orientation of the at least one surface, by which an appearance of a reflection on the at least one surface in the at least one camera image is reduced, and to generate the control signal according to the target polarization direction.

9. A method for suppression of representations of reflections in at least one camera image of a camera of an environment sensor device of a motor vehicle, comprising:
using the camera to generate the at least one camera image, the at least one camera image representing an environment of the motor vehicle;

using a polarization filter device to dampen light having a polarization direction incident in the camera from the environment;
using a processor device to identify at least one environment object in the at least one camera image;
using an estimator device to estimate an orientation of at least one surface on the at least one environment object;
using an adjusting device to determine a target polarization direction for the polarization filter device in dependence on the estimated orientation, by which a representation of reflections at the surface is reduced in the at least one camera image, and generate a control signal according to the determined target polarization direction; and;
using the polarization filter device to adjust the polarization direction in dependence on the control signal.

\* \* \* \* \*